United States Patent
Brumble

(10) Patent No.: US 7,283,617 B2
(45) Date of Patent: *Oct. 16, 2007

(54) METHODS AND TEST SETS FOR TESTING MULTI-LINE TELECOMMUNICATIONS SERVICE

(75) Inventor: Michael T. Brumble, Florence, SC (US)

(73) Assignee: AT&T BLS Intellectual Property, Inc.,, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/226,516

(22) Filed: Sep. 14, 2005

(65) Prior Publication Data

US 2006/0023845 A1 Feb. 2, 2006

Related U.S. Application Data

(63) Continuation of application No. 10/255,739, filed on Sep. 26, 2002, now Pat. No. 6,970,534.

(51) Int. Cl.
*H04M 1/24* (2006.01)
*H04M 3/08* (2006.01)
*H04M 3/22* (2006.01)

(52) U.S. Cl. .................. 379/21; 379/22.07; 379/19; 379/27.07

(58) Field of Classification Search .................. 379/21, 379/1.01, 19, 22, 22.07, 27.07, 413.02, 413.04, 379/413.03; 439/701, 715; 324/500, 76.11
See application file for complete search history.

(56) References Cited

U.S. PATENT DOCUMENTS 5,228,072 A * 7/1993 Ingalsbe et al. .............. 379/21
6,970,534 B1 * 11/2005 Brumble ...................... 379/21

OTHER PUBLICATIONS

"TS® ADSL Test Set, Quick & Easy ADSL Service Verification," ADSL Test Sets, Next Level Solutions, Harris Corporation, May, 2000.
"TS® 1200 ADSL/POTS Test Set, Simultaneous Testing of ADSL and POTS Services," Broadband Test Set, Next Level Solutions, Harris Corporation, no date provided.

* cited by examiner

*Primary Examiner*—Quoc Tran
(74) *Attorney, Agent, or Firm*—Merchant & Gould

(57) ABSTRACT

Methods and test sets allow multi-line telecommunications services to be tested. The methods and test sets utilize multiple connections so that test connections to multiple lines can be made at once. Multiple test clips may be used where two clips are attached to two conductors of the test set for each line to be tested. A modular plug such as an RJ-11 plug may be used to plug into a modular jack that provides multiple lines of telecommunication service, and the modular plug has a pair of conductors connected to a pair of conductors of a test set for each line to be tested. Additionally, various combinations of clips and modular plugs may be provided to establish test connections to the multiple telecommunication lines to be tested.

20 Claims, 2 Drawing Sheets

METHODS AND TEST SETS FOR TESTING MULTI-LINE TELECOMMUNICATIONS SERVICE

CROSS REFERENCE TO RELATED APPLICATION

This application is a continuation of application Ser. No. 10/255,739 filed Sep. 26, 2002 now U.S. Pat. No. 6,970,534.

TECHNICAL FIELD

The present invention relates to testing of telecommunications service. More particularly, the present invention relates to testing of multiple lines of telecommunications service with a single test set.

BACKGROUND

Landline telecommunications services are provided at least partially through electrical conductors that establish circuits between telecommunications provider equipment and the devices of the end user such as a telephone or computer. During installation or subsequent troubleshooting of the telecommunications lines, the service to be provided through the lines may be tested using a test set. The test set allows a technician to test many variables of the telecommunication service such as the polarity of the voltage over the electrical conductors, the amount of noise present on the lines, and other factors related to the quality and reliability of the telecommunications service.

The test set analyzes telecommunications service through a physical connection that establishes electrical continuity between the test set and the two conductors of a line of telecommunications service. This physical connection is typically a pair of conductive clips that grasp the electrical conductor pairs. Tests may also be performed through the modular jacks generally located on a wall by coupling the test clips to a banjo, which then plugs into the modular jack to establish continuity between the modular jack and the test clips of the test set.

Some customers require telecommunication services that provide multiple telecommunications lines. For example, a single household may choose to have one telephone line for ordinary voice telephone calls while having another telephone line reserved for facsimiles. Each of these multiple lines of the telecommunications service are tested to verify proper connections, quality, and reliability. Conventionally, this requires that a technician connect the test set to the first line and then test it accordingly. Then, the technician disconnects the test set from the first line and reconnects the test set to the second line to test it accordingly. Alternatively, the technician must utilize multiple test sets where each test set is used to test one of the multiple telecommunication lines. Thus, it is inconvenient for the technician to test multiple telecommunication lines.

SUMMARY

Embodiments of the present invention address these and other issues by providing methods and test sets for testing multiple communications lines. The methods and test sets allow the multiple communication lines to be tested using one test set but without requiring the technician to connect and then disconnect the test from a line before testing another. Thus, the technician can make the necessary connections for the multiple lines to be tested, run the appropriate tests using the single test set, and then complete the task by disconnecting the test set from the multiple lines.

One embodiment provides a device for testing telecommunication circuits that includes a test set having circuitry for testing first and second telecommunications circuits. The circuitry includes a first tester electrically connected to first and second conductors extending from the test set, and the circuitry further includes a second tester electrically connected to third and fourth conductors extending from the test set. A first test clip is electrically connected to the first conductor of the test set, and a second test clip is electrically connected to the second conductor of the test set. Likewise, a third test clip is electrically connected to the third conductor of the test set, and a fourth test clip is electrically connected to the fourth conductor of the test set.

One embodiment provides a device for testing telecommunications circuits that includes a test set having circuitry for testing first and second telecommunications circuits. The circuitry includes a first tester electrically connected to first and second conductors extending from the test set, and the circuitry further includes a second tester electrically connected to third and fourth conductors extending from the test set. A modular plug includes a first, a second, a third, and a fourth conductor. The first conductor of the modular plug is electrically connected to the first conductor of the test set, the second conductor of the modular plug is electrically connected to the second conductor of the test set, the third conductor of the modular plug is electrically connected to the third conductor of the test set, and the fourth conductor of the modular plug is electrically connected to the fourth conductor of the test set.

One embodiment of a method of testing a two line telecommunication service with a test set capable of testing multiple communication lines involves attaching a first clip to a first conductor of the two line telecommunication service and attaching a second clip to a second conductor of the two line telecommunication service. A third clip is attached to a third conductor of the two line telecommunication service, and a fourth clip is attached to a fourth conductor of the two line telecommunication service. The method also involves operating circuitry of the test set to test a first line of the two line telecommunication service through the first clip and second clip. The method further involves operating circuitry of the test set to test a second line of the two line telecommunication service through the third clip and fourth clip.

One embodiment of a method of testing a two line telecommunication service with a test set capable of testing multiple communication lines involves attaching a modular plug to a modular jack providing the two line telecommunication service. The modular plug is attached to the modular jack such that a first conductor and second conductor of the modular plug are electrically connected to a first conductor and second conductor of the modular jack that provide a first line of the two line telecommunication service. The modular plug is also attached to the modular jack such that a third conductor and a fourth conductor of the modular plug are electrically connected to a third conductor and a fourth conductor of the modular jack that provide a second line of the two line telecommunication service. The method further involves operating circuitry of the test set to test the first line of the two line telecommunication service through the first conductor and second conductor of the modular plug. Additionally, the method involves operating circuitry of the test set to test the second line of the two line telecommunication service through the third conductor and fourth conductor of the modular plug.

One embodiment of a method of testing a two line telecommunication service with a test set capable of testing multiple communication lines involves attaching a modular plug to a modular jack providing the two line telecommunication service. The modular plug is attached to the modular jack such that a first conductor and second conductor of the modular plug are electrically connected to a first conductor and second conductor of the modular jack that provide a first line of the two line telecommunication service. A first clip is attached to a third conductor, and a second clip is attached to a fourth conductor wherein the third conductor and fourth conductor provide a second line of the two line telecommunication service. The method also involves operating circuitry of the test set to test the first line of the two line telecommunication service through the first conductor and second conductor of the modular plug. The method further involves operating circuitry of the test set to test the second line of the two line telecommunication service through the first clip and second clip.

DETAILED DESCRIPTION

Embodiments of the present invention provide a single test set with the ability to test multiple telecommunication lines contemporaneously. The embodiments permit the multiple telecommunication lines to be tested without requiring the technician to connect to and test one line and then disconnect from the one line prior to testing the next line. Various line connection configurations for the test set may be utilized in conjunction with embodiments of the present invention to provide the ability to test multiple communications lines.

Figure 1:
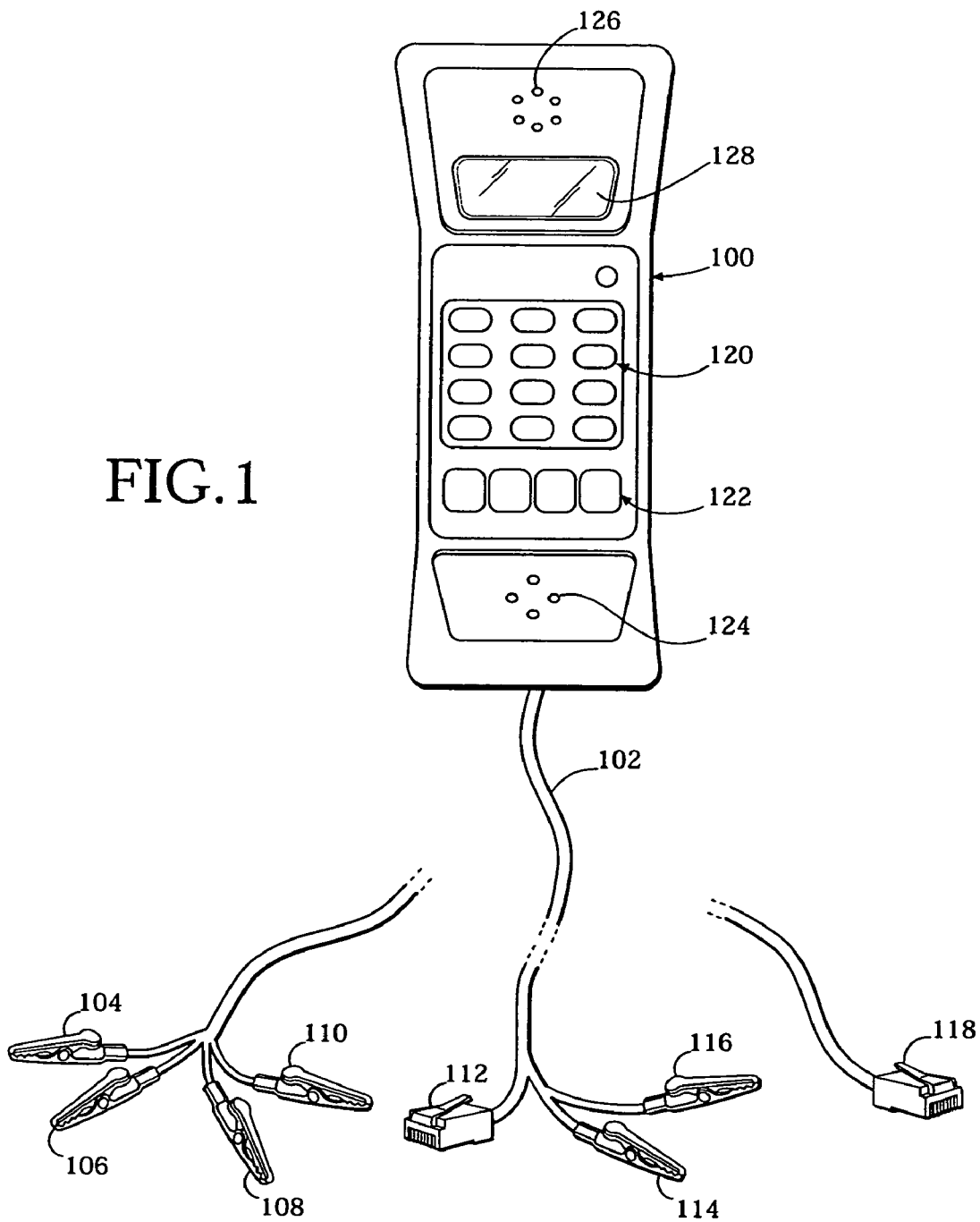
FIG. 1 shows an external view of a multi-line test set according to one embodiment of the present invention where multiple line connection options are possible.

FIG. 1 shows an example of a test set 100 according to one embodiment of the present invention. The test set 100 has an external connection to the telecommunications lines to be tested through a cable 102. The cable 102 contains four or more isolated conductors depending upon the number of telecommunications lines to be tested at any time. Two isolated conductors are provided per telecommunication line to be tested. The cable 102 extends to a set of connectors having one of several potential configurations. Although FIG. 1 and the related discussion cover a single cable 102, it will be appreciated that a different number of cables may be used, such as a cable for each individual conductor or a cable for each conductor pair used to test a telecommunication line.

As an example of a potential configuration for the connectors of the test set 100, the cable 102 may terminate with each of the isolated conductors terminating at a different test clip that may be used to clamp onto one of the conductors of each pair forming the telecommunication lines. As shown, the test set 100 is configured to test two telecommunications lines, and cable 102 in one alternative terminates at a first clip 104 for a first conductor and clip 106 for a second conductor for testing a first communication line. The cable 102 also terminates at a third clip 108 for a third conductor and at a fourth clip 110 for a fourth conductor for testing a second communication line.

As an alternative, the cable 102 of the example of FIG. 1 may terminate at a modular plug 112, such as a standard RJ-11 plug where the first conductor and second conductor of cable 102 are connected to two of the conductor pins of the RJ-11 plug. The RJ-11 plug 112 allows testing of a first telecommunication line by plugging into an RJ-11 jack that the first telecommunication line is provided through. The cable 102 also terminates at a first clip 114 for the third conductor of cable 102 and at a second clip 116 for the fourth conductor of cable 102. The first clip 114 and second clip 116 allow the second telecommunication line to be tested by clamping onto the conductor pair of the second telecommunication line.

As another alternative, the cable 102 of the example of FIG. 1 may terminate at a modular plug 118, such as a standard RJ-11 plug. However, in this alternative, all four conductors of the RJ-11 plug 118 are used so that both telecommunication lines provided through an RJ-11 jack may be tested by plugging in the RJ-11 plug. The first and second conductors of the cable 102 terminate at the conductor pair of the RJ-11 plug 118 for the first telecommunication line while the second and third conductors of the cable 102 terminate at the conductor pair of the RJ-11 plug 118 for the second telecommunication line.

Other alternatives are possible as well. For example, the test set 100 configured to test two telecommunications lines may include four isolated conductors with each terminating at a test clip, while also having a modular plug wired in parallel with the test clips so that either the clips or the plug or a combination of both may be used to test the multiple telecommunications lines.

The test set 100 includes conventional components as well. For example, the test set 100 provides a keypad 120 allowing the technician to dial telephone numbers to place test calls through the test set. The test set 100 also includes function keys 122 that allow various test modes to be utilized as are known in the art. Function keys 122 may also be included to control which telecommunication is to receive the input through the keypad 120 at any given time. Also, the function keys 122 may control which telecommunication circuit being tested has its diagnostic information displayed on display screen 128 or through any other visual indicator such as a light emitting diode. The test set 100 may also include the conventional speaker 126 and microphone 124 that allows the technician to communicate during test calls.

Figure 2:
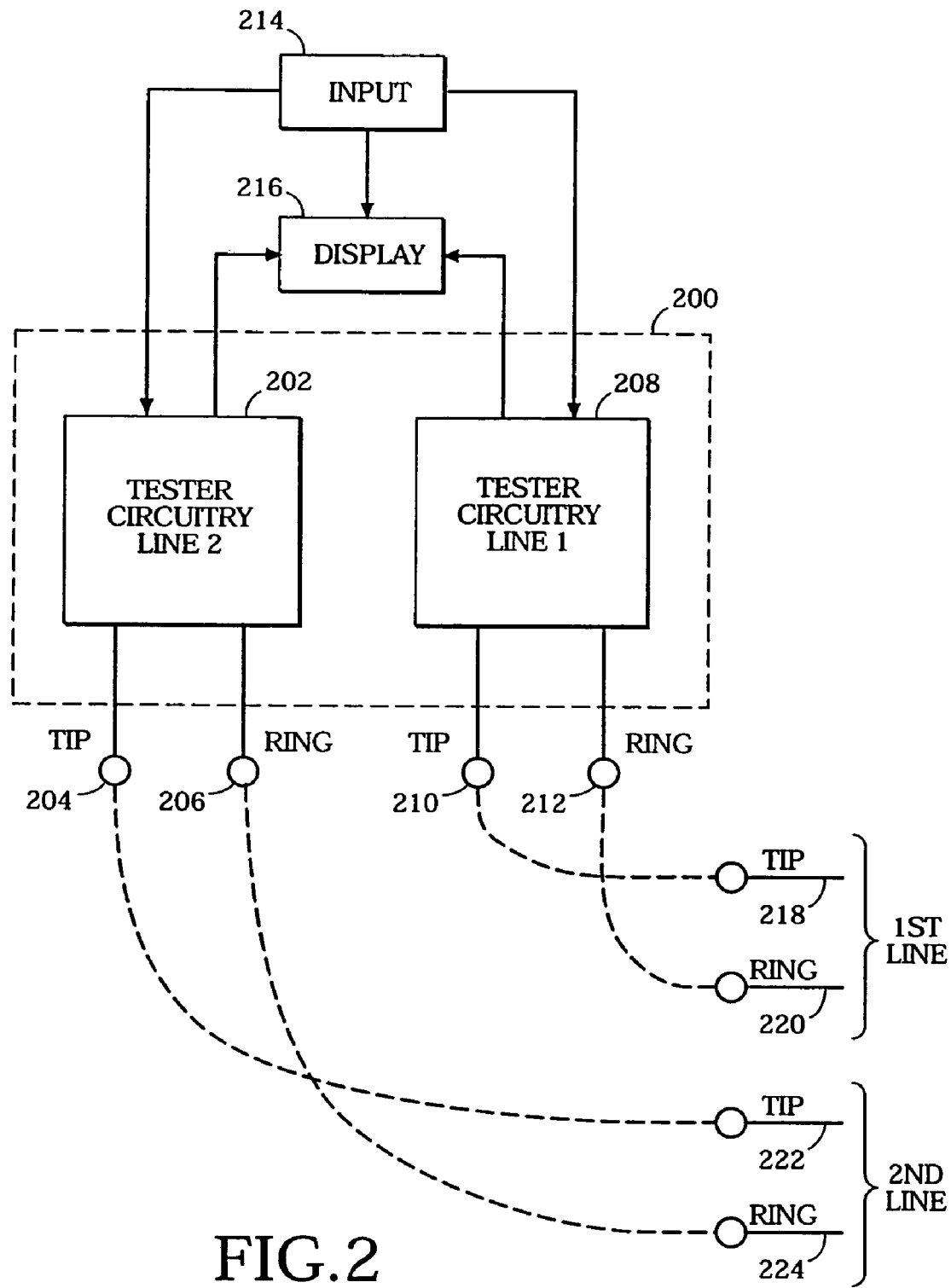
FIG. 2 shows the major functional components of the multi-line test set of FIG. 1.

FIG. 2 shows the major functional components within the test set 100 and the electrical connections to the multiple telecommunications lines to be tested. In the example shown, test circuitry of the tester 100 includes multiple testers to allow the multiple communications lines to be simultaneously tested. However, it will be appreciated that the function keys 122 of the test set 100 may be used in conjunction with a single tester and the multiple conductors of the cable 102 to connect the single tester to one pair of conductors at one time and another pair at another time to test one or the other of the telecommunications lines.

As shown for the embodiment of FIG. 2, a circuitry 200 includes a first tester 202 for testing a first telecommunication line and a second tester 208 for testing a second telecommunication line. The first tester 202 and second tester 208 include test circuitry generally known in the art for one or more types of telecommunications services provided over a telecommunication line. For example, the first and second testers may be configured to test plain old telephone service ("POTS") for a telecommunication line and/or digital subscriber line ("DSL") service for the same or different telecommunication line.

The first tester and second testers 202 and 208 are linked to a display 216 for a test set, such as a display screen or indicator LEDs. Also, the first and second testers 202 and 208 are linked to an input device of a test set, such as a keypad for dialing and function selection. The input device 214 may also be linked to the display 216 to provide a visual indication of the inputs that are received from the user of the test set.

The first and second testers 202 and 208 receive the information provided through the input 214 based upon which tester the user has selected. The tester 202 or 208 then employs the user input to generate the test services for the telecommunication line, such as testing outbound calling and inbound call reception. The results of the tests may be displayed or otherwise indicated on the display 216.

The first tester 202 provides a tip connection 204 and a ring connection 206 for testing a two-conductor telecommunication line having a tip connection 222 and ring connection 224. The first tester 202 thus completes a circuit for the second telecommunication line to test the operability and/or quality of service through the line. The connection established between the tip connection 204 and tip connection 222 and between the ring connection 206 and ring connection 224 may be provided through one of the various connections described above. For example, the connection may be established through test clips that are connected directly to the tip 204 and ring 206 through the cable 102 of FIG. 1 and that are clamped onto the tip conductor 222 and ring conductor 224, respectively. As another example, the tip 204 and ring 206 may be connected through cable 102 to a modular plug so that the test connection is established by plugging the modular plug into a jack with pins for the tip connection 222 and ring connection 224.

The second tester 208 provides a tip connection 210 and ring connection 212 for testing another two-conductor telecommunication line having a tip connection 218 and a ring connection 220. The second tester 208 thus completes a circuit for the first telecommunication line to test the operability and/or quality of service through the line. The connection established between the tip connection 210 and tip connection 218 and between the ring connection 212 and ring connection 220 may be provided through one of the various connections described above as well. Examples of these connections also include test clips or a modular plug.

Thus, the embodiment shown in FIG. 2 allows the first and second telecommunication lines to be tested contemporaneously using a single test with connections for both lines. Because connections for both lines are provided, both lines may be tested without requiring a single set of connectors to be attached to one line and then removed so that the same set of connectors can be attached to the next line to test.

While the invention has been particularly shown and described with reference to illustrative embodiments thereof, it will be understood by those skilled in the art that various other changes in the form and details may be made therein without departing from the spirit and scope of the invention.

What is claimed is:

1. A device for testing telecommunications circuits, comprising:
    a test set having circuitry for testing first and second telecommunications circuits, the circuitry including a first tester electrically connected to first and second conductors extending from the test set, and the circuitry further including a second tester electrically connected to third and fourth conductors extending from the test set;
    a first test clip electrically connected to the first conductor of the test set;
    a second test clip electrically connected to the second conductor of the test set; and
    a modular plug including at least a first and a second conductor, wherein the first conductor of the modular plug is electrically connected to the third conductor of the test set, the second conductor of the modular plug is electrically connected to the fourth conductor of the test set.

2. The device of claim 1, wherein the modular plug is an RJ-11 plug.

3. The device of claim 1, wherein the first tester and the second tester are configured to operate simultaneously.

4. The device of claim 1, further comprising:
    at least one additional tester to test an additional telecommunications circuit tester electrically connected to a first additional conductor and a second additional conductor extending from the at least one additional test set; wherein the first and the second additional conductors are electrically connected to a first additional clip and a second additional clip, respectively.

5. The device of claim 4, wherein the first and the second additional conductors are also electrically connected to an additional modular plug including a pair of conductors.

6. The device of claim 1, further comprising:
    at least one additional tester electrically connected to a first additional conductor and a second additional conductor extending from the at least one additional test set; wherein the first and the second additional conductors are electrically connected to an additional modular plug including a pair of conductors.

7. The device of claim 6, wherein the first tester, the second tester, and the at least one additional tested are configured to operate simultaneously.

8. A device for testing telecommunications circuits, comprising:
    a test set having circuitry for testing first and second telecommunications circuits, the circuitry including a first tester electrically connected to first and second conductors extending from the test set, and the circuitry further including a second tester electrically connected to third and fourth conductors extending from the test set;
    a first test clip electrically connected to the first conductor of the test set;
    a second test clip electrically connected to the second conductor of the test set;
    a modular plug including at least a first and a second conductor, wherein the first conductor of the modular plug is electrically connected to the third conductor of the test set, the second conductor of the modular plug is electrically connected to the fourth conductor of the test set; and
    a keypad configured to enable a test technician to dial a Dual Tone Multi Frequency (DTMF) tone set during a test on a selected one of the telecommunication circuits.

9. The device of claim 8, further comprising:
    a function key configured to enable a test technician to transmit a predetermined signal during a test to a selected one of the telecommunication circuits.

10. The device of claim 9, further comprising:
another function key configured to enable a test technician to select one of the telecommunication circuits to be tested.

11. The device of claim 10, further comprising:
a visual indicator configured to show a selected one of the telecommunication circuits during a test.

12. A device for testing telecommunications circuits, comprising:
a test set having circuitry for testing first and second telecommunications circuits, the circuitry including a first tester electrically connected to first and second conductors extending from the test set, and the circuitry further including a second tester electrically connected to third and fourth conductors extending from the test set;
a first test clip electrically connected to the first conductor of the test set;
a second test clip electrically connected to the second conductor of the test set;
a modular plug including at least a first and a second conductor, wherein the first conductor of the modular plug is electrically connected to the third conductor of the test set, the second conductor of the modular plug is electrically connected to the fourth conductor of the test set;
a keypad configured to enable a test technician to dial a Dual Tone Multi Frequency (DTMF) tone set during a test on a selected one of the telecommunication circuits;
a function key configured to enable a test technician to transmit a predetermined signal during a test to a selected one of the telecommunication circuits;
another function key configured to enable a test technician to select one of the telecommunication circuits to be tested; and
a visual indicator configured to show a selected one of the telecommunication circuits during a test, wherein the visual indicator includes at least one of a Light Emitting Diode (LED) and a display screen associated with each pair of the conductors extending from the test set.

13. A method of testing a multi-line telecommunication service with a test set capable of testing multiple communication lines, comprising:
attaching one of a pair of clips and a modular plug with at least two conductors to a first conductor and a second conductor of a first communication line;
attaching another of the pair of clips and the modular plug with at least two conductors to a third conductor and a fourth conductor of a second communication line;
attaching a further one of the pair of clips and the modular plug with at least two conductors to a fifth conductor and a sixth conductor of a third communication line;
operating circuitry of the test set to test the first communication line through the one of the pair of clips and the modular plug;
operating circuitry of the test set to test the second communication line through the other of the pair of clips and the modular plug; and
operating circuitry of the test set to test the third communication line through the further one of the pair of clips and the modular plug.

14. The method of claim 13, further comprising operating the circuitry of the test set to test the first, the second, and the third communication lines simultaneously.

15. The method of claim 13, further comprising operating the circuitry of the test set by transmitting a DTMF tone set to a selected one of the communication lines in response to a selection on a keypad on the test set during a test.

16. The method of claim 13, further comprising operating the circuitry of the test set by transmitting a predetermined signal to a selected one of the communication lines in response to a selection of a function key on the test set during a test.

17. The method of claim 13, further comprising enabling a test technician to select one of the communication lines in response to a selection of another function key on the test set during a test.

18. The method of claim 17, further comprising indicating the selected one of the communication lines through a visual indicator on the test set.

19. The method of claim 18, wherein the visual indicator includes at least one of a Light Emitting Diode (LED) and a symbol on a display screen associated with each pair of the conductors extending from the test set.

20. The method of claim 13, wherein the modular plug is an RJ-11 plug.

* * * * *